Aug. 25, 1953  E. SESINI ET AL  2,650,260
STOP JOINT FOR OIL FILLED CABLES
Filed Nov. 1, 1949  2 Sheets-Sheet 1
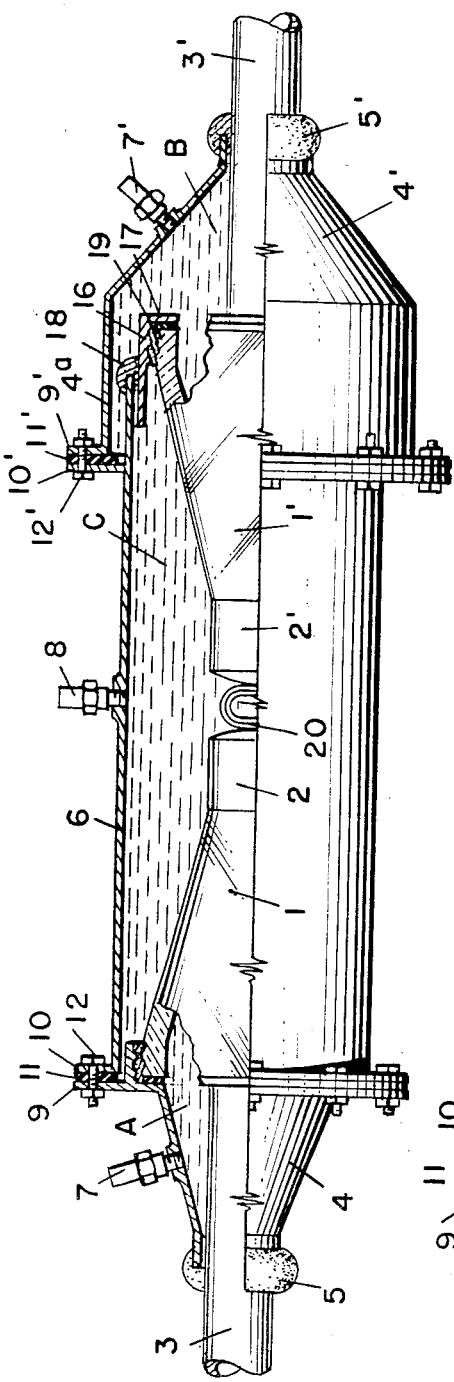
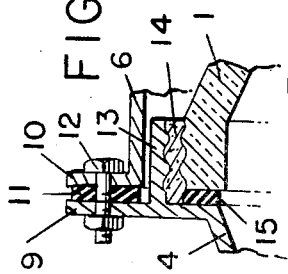
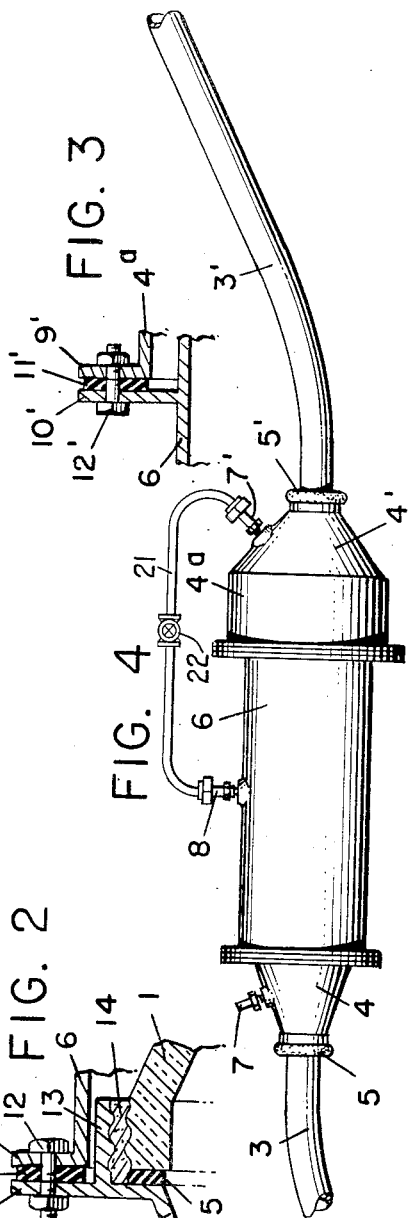
Inventors
ENRICO SESINI, &
MARIO PIERAZZUOLI,
By Stone, Boyden & Mack,
Attorneys Aug. 25, 1953 E. SESINI ET AL 2,650,260
STOP JOINT FOR OIL FILLED CABLES
Filed Nov. 1, 1949 2 Sheets-Sheet 2
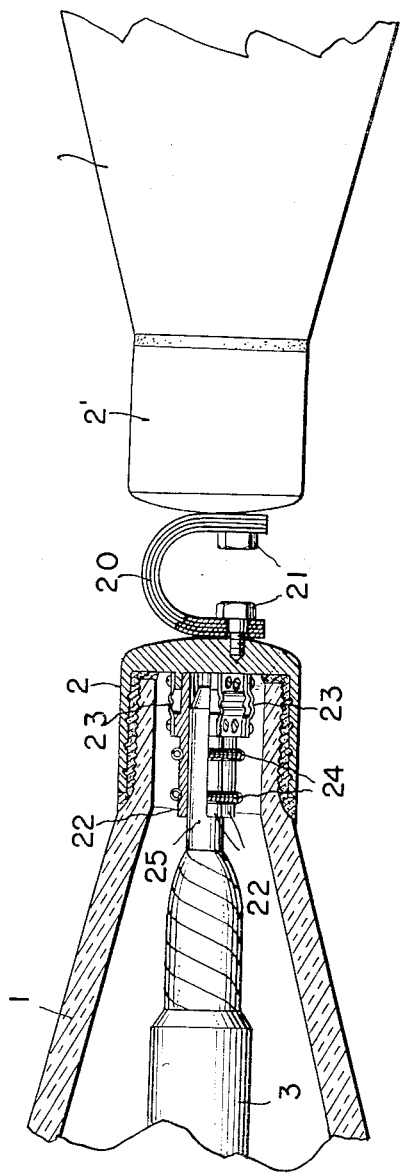
INVENTORS
ENRICO SESINI, &
MARIO PIERAZZUOLI,
BY Stone, Boyden & Mack,
ATTORNEYS Patented Aug. 25, 1953

2,650,260

UNITED STATES PATENT OFFICE 2,650,260

STOP JOINT FOR OIL-FILLED CABLES

Enrico Sesini and Mario Pierazzuoli, Milan, Italy, assignors to Pirelli Societa per Azioni, Milan, Italy Application November 1, 1949, Serial No. 124,913
In Italy November 27, 1948

6 Claims. (Cl. 174—22)

This invention relates to stop joints for oil filled, sheathed cables, and more particularly to the construction of the enclosing casing forming a part of such joints.

The stop joint of the present invention is of the same general type as those shown in Patent 1,819,882, to Eby, dated August 18, 1931, and Patents 1,979,149 and 2,120,889 to Emanueli, dated October 30, 1934, and June 14, 1938, respectively.

As is well known, the purpose of such stop joints is to divide the cable into sections so as to limit the hydrostatic head of the contained oil on the enclosures, where the cable is laid in sloping ground, and so that, also, in the event of a leak in one section, the oil will not be drained from the adjacent sections.

Such structures usually comprise an elongated main casing having terminal caps at its ends, and it has heretofore been the common practice to secure such caps to the casing by means of soldered or "wiped" joints, as illustrated in the above mentioned patents.

When, however, the liquid pressure in the cable reaches a very high value, as, for example, on steep slopes, we have found that these soldered joints are not strong enough to withstand the strain, and that they frequently give way, thus permitting the oil to escape and causing a breakdown of the system.

It is, therefore, an object of the present invention to devise a stronger and more effective method of uniting the terminal caps with the main casing. To this end, the invention contemplates the employment of special flanged joints held together by bolts.

This gives rise to a problem of assembly, and another object of the invention is to so construct the enclosure that the parts, including the usual insulators, may be readily assembled, and that a soldered joint may be employed at a point within one of the terminal caps, where it is not subjected to any great pressure differences.

In order that the invention may be readily understood, reference is had to the accompanying drawing forming part of this specification and in which:

Fig. 1 is a view partly in side elevation and partly in longitudinal section, showing our improved stop joint, parts being broken away.

Fig. 2 is a fragmentary sectional view on an enlarged scale showing details of the connection between the main casing and terminal cap at the lefthand end of Fig. 1.

Fig. 3 is a similar view showing details of the connection between the main casing and terminal cap at the righthand side of Fig. 1;

Fig. 4 is a side elevation on a smaller scale showing our improved joint as it appears when assembled, and Fig. 5 is a fragmentary view on an enlarged scale, partly in longitudinal section and partly in side elevation, showing the construction of the insulators and terminals.

Referring to the drawing in detail, our improved joint comprises the usual conical insulators 1 and 1', having at their inner ends metal terminals 2 and 2', sealed to the ends of the insulators by means of cement, as shown in Fig. 5. The conductors 25 of the cables 3 and 3' are connected to the respective terminals 2 and 2' by suitable means, such means being shown in Fig. 5 as comprising resilient sockets into which the ends of the conductors are inserted. Each of these sockets consists of a circular series of longitudinally extending plates 22, flexibly supported on the terminal by means of corrugated metallic strips 23, and surrounded by one or more elastic bands in the nature of circular helical springs 24. The terminals 2 and 2' are electrically connected by a suitable flexible conductor 20, secured to the terminals by bolts 21.

The joint structure comprises terminal caps 4 and 4' secured to opposite ends of the main casing 6, the terminal caps 4 and 4' being sealed at their outer ends to the lead sheath of the cables by means of soldered or "wiped" joints 5 and 5' as is customary.

The terminal caps 4 and 4' are equipped with special fittings 7 and 7', and the casing 6 is equipped with a similar fitting 8, the purpose of these fittings, as is well understood, being to permit the supply or discharge of oil to or from the interior of the joint structure.

Adjacent one end, as shown at the left in Fig. 1, the casing 6 is formed with an out-turned radial flange 10, and the terminal cap 4 has a parallel radially extending portion 9. A suitable gasket 11 is interposed between the parts 9 and 10, and these parts are then united by a series of bolts 12 extending therethrough. Thus a strong bolted flange connection is provided.

The terminal cap 4 is also formed with an annular, axially projecting flange 13, into which the outer end of the insulator 1 is fitted, and to which it is sealed by suitable cement 14, a gasket 15 being also preferably interposed between the end of the insulator and the cap 4. The insulator is, of course, sealed at its inner end, and therefore the space within the insulator 1 and terminal cap 4 constitutes a chamber A which is entirely separate from the interior of the main casing. It will, of course, be understood that the hollow interior of the cable 3 communicates with the interior of the insulator 1, so that oil may freely flow back and forth between the chamber A and the interior of the cable.

The opposite end of our improved joint is constructed differently, as shown at the righthand side of Fig. 1. From this it will be seen that the main casing 6 is provided with a radially extending flange 10', located a substantial distance from the extreme end of the casing. The terminal cap 4' is formed with an extension 4a which surrounds and is spaced from the end of the casing 6, which extends beyond the flange 10'. The inner end of the cap 4' is formed with an out-turned radial flange 9'. A suitable gasket 11' is interposed between the flanges 9' and 10' and the parts tightly secured together by means of a series of bolts 12' extending therethrough.

As above described in connection with the cable 3, the hollow interior of cable 3' communicates with the interior of the insulator 1' so that the interior of this insulator and the interior of the cap 4' form an oil containing chamber B.

A sleeve member 16 fits within, and is secured to, the projecting end of the main casing 6 as by means of a soldered joint 18. The outer end of the sleeve member 16 is formed with an inwardly directed radial flange 17 against which the end of the insulator 1' abuts, a suitable gasket being interposed, and the insulator being sealed to the sleeve member 16 by suitable cement, as indicated at 19. Thus the chamber B is entirely separate from the chamber C formed in the interior of the main casing 6.

It will, of course, be understood that, as shown in the above mentioned patents, the insulators 1 and 1' are covered with layers of suitable coated paper or fabric, which is impregnated with the oil, but, for the sake of clearness, such insulating material has been omitted from the drawing.

In assembling our improved joint, the main casing 6 is put in place by sliding it from right to left, and then the flanged connection 9, 10 and 11 is made by inserting and tightening the bolts 12. Thereafter the soldered connection 18 is made, and lastly the terminal cap 4' is applied over and around the connection 18 by uniting the parts 9', 10' and 11' by inserting and tightening the bolts 12'.

Our improved joint is necessarily asymmetrical. When used on sloping ground, the righthand end of the joint is placed on the high side, as illustrated in Fig. 4. To relieve the strain on the relatively weak connection 18, the fittings 7' and 8 may be connected by a pipe 21, having a manual valve 22, so as to equalize the pressures in the chambers B and C. If this were not done, not only might the connection 18 be ruptured, by the excessive pressure existing in chamber B, but also the insulator 1' might be burst by such pressure. The bolted flanged connections above described, between the terminal caps and the main casing, are sufficiently strong to withstand any pressure likely to be encountered, and although the pressure in chamber C would, on sloping ground, be much greater than that in chamber A, there would be no tendency for such a pressure difference to rupture the insulator 1, since the pressure is applied to the outside thereof.

While the connection 18 has been shown and described as a soldered joint, other suitable forms of connection may be employed, as, for example, by screwing the sleeve 16 into the casing or by forcing packing material between the two parts.

What we claim is:

1. A stop joint for oil filled sheathed cables, comprising an elongated casing, and terminal caps at each end of said casing having apertures through which the cables may pass into said casing and adapted to be secured to the sheath of said cables, said casing having adjacent each end a radially extending peripheral flange, and said caps having parallel radially extending portions secured to said flanges by a series of bolts, one of said flanges being at one extreme end of said casing while the other flange is spaced longitudinally a substantial distance from the opposite end, and the cap at said last mentioned end having a portion surrounding and spaced from said casing.

2. A stop joint for oil filled sheathed cables, comprising an elongated casing, and separately formed terminal caps at the ends of said casing having apertures through which the cables may pass into said casing and adapted to be secured to the sheath of said cables, insulators within said casing constructed to surround the respective cables near the ends thereof, said insulators being sealed at their inner ends by conductive terminals to which the cable ends are connected, conductive means between said terminals uniting the same, one of said insulators being sealed at its outer end directly to one of said caps, independently of said casing, means for securing said cap to the extreme end of said casing, means establishing a fluidtight connection between the outer end of the other of said insulators and said casing at a point inside the other of said caps, and a bolted joint securing said last mentioned cap to said casing at a point intermediate the ends of the latter.

3. A stop joint in accordance with claim 2 in which the means for establishing a fluid-tight connection comprises a sleeve to which the insulator is sealed, and said sleeve being secured to the inside of said casing.

4. A stop joint in accordance with claim 2 in which the means for establishing a fluidtight connection comprises a sleeve to which the insulator is sealed, and in which the end of the casing projects beyond the bolted joint, and the sleeve is secured to the projecting end of the casing inside of the associated cap.

5. A stop joint for oil filled sheathed cables, comprising an elongated casing, and terminal caps at each end of said casing having apertures through which the cables may pass into said casing and adapted to be secured to the sheath of said cables, insulators within said casing constructed to surround the respective cables near the ends thereof, said insulators being sealed at their inner ends by conductive terminals to which the cable ends are connected, conductive means between said terminals uniting the same, one of said insulators being sealed at its outer end to one of said caps, and a sleeve member to which the outer end of the other of said insulators is sealed, said sleeve member fitting within the adjacent end of said casing and connected thereto by means of a soldered joint, the cap at that end of said casing enclosing said soldered joint and being connected with the casing by means of a bolted joint located a substantial distance from the extreme end of the casing.

6. A stop joint for oil filled sheathed cables, comprising an elongated casing, and terminal caps at each end of said casing having apertures through which the cables may pass into said casing and adapted to be secured to the sheath of said cables, insulators within said casing constructed to surround the respective cables near the ends thereof, said insulators being sealed at their inner ends by conductive terminals to which the cable ends are connected, conductive means between said terminals uniting the same, one of said insulators being sealed at its outer end to one of said caps, and a sleeve member to which the outer end of the other of said insulators is sealed, said sleeve member fitting within the adjacent end of said casing and connected thereto by means of a soldered joint, the cap at that end of said casing enclosing said soldered joint, whereby said soldered joint forms an oil-tight division between the chamber within the adjacent cap and the chamber within said casing, and conduit means connecting said chambers outside of said cap and casing to equalize the pressure therein.

ENRICO SESINI.
MARIO PIERAZZUOLI.

References Cited in the file of this patent

UNITED STATES PATENTS

| Number | Name | Date |
|---|---|---|
| 1,979,149 | Emanueli | Oct. 30, 1934 |
| 2,049,465 | Meyer et al. | Aug. 4, 1936 |
| 2,239,900 | Papp | Apr. 29, 1941 |
| 2,392,748 | Lee | Jan. 8, 1946 |
| 2,414,106 | Kelly | Jan. 14, 1947 |

FOREIGN PATENTS

| Number | Country | Date |
|---|---|---|
| 743,544 | France | Apr. 1, 1933 |